(12) United States Patent
Roper

(10) Patent No.: US 10,655,767 B2
(45) Date of Patent: May 19, 2020

(54) ROTATABLE PIPE ADAPTER

(71) Applicant: John O. Roper, Fountain Inn, SC (US)

(72) Inventor: John O. Roper, Fountain Inn, SC (US)

(*) Notice: Subject to any disclaimer, the term of this patent is extended or adjusted under 35 U.S.C. 154(b) by 363 days.

(21) Appl. No.: 15/166,466

(22) Filed: May 27, 2016

(65) Prior Publication Data
US 2017/0343140 A1   Nov. 30, 2017

(51) Int. Cl.
*F16L 47/02* (2006.01)
*F16L 27/08* (2006.01)
*F16L 47/18* (2006.01)

(52) U.S. Cl.
CPC ....... *F16L 27/0816* (2013.01); *F16L 27/0845* (2013.01); *F16L 47/02* (2013.01); *F16L 47/18* (2013.01)

(58) Field of Classification Search
CPC . F16L 17/02; F16L 17/06; F16L 21/02; F16L 21/04; F16L 21/08; F16L 27/0849; F16L 27/0804; F16L 47/06; F16L 47/065; F16L 47/18; F16L 47/04; F16L 47/041
USPC .......... 285/98, 272, 273, 275, 278, 280, 282
See application file for complete search history.

(56) References Cited

U.S. PATENT DOCUMENTS

| | | | |
|---|---|---|---|
| 3,606,402 A | 9/1971 | Medney | |
| 3,722,926 A * | 3/1973 | Fukushima | F16L 27/04 285/261 |
| 3,764,170 A * | 10/1973 | Brown | F16L 21/08 285/368 |
| 3,916,502 A | 11/1975 | Bagnulo | |
| 4,611,834 A * | 9/1986 | Rabinovich | F16L 37/148 285/121.6 |
| 4,905,766 A | 3/1990 | Dietz et al. | |
| 4,998,755 A * | 3/1991 | Reeder | B05B 15/652 285/181 |
| 5,486,024 A | 1/1996 | Dierdorf | |
| 5,813,705 A | 9/1998 | Dole | |
| 6,343,813 B1 | 2/2002 | Olson et al. | |
| 6,508,492 B2 * | 1/2003 | Nixon | F16L 27/0812 285/280 |
| 7,108,295 B1 | 9/2006 | Zarynow | |
| 8,047,579 B2 * | 11/2011 | Taillon | F16L 27/0812 285/280 |

(Continued)

FOREIGN PATENT DOCUMENTS

GB       2131511 A * 6/1984  ........ A61M 39/1055

*Primary Examiner* — Aaron M Dunwoody
(74) *Attorney, Agent, or Firm* — JK Intellectual Property Law, PA

(57) ABSTRACT

A pipe adapter includes a first tubular element having a first portion and a second portion axially adjacent the first portion defining a socket. A second tubular element has a first portion and a second portion axially adjacent the first portion, the first portion defining a distal end sized for insertion into the socket and having a radially extending stop. An annular sealing member is located between the first portion of the second tubular element and the second portion of the first tubular element and provides an axial seal therebetween. An annular securing member is rotatably disposed around the first portion of the second tubular element and located within and fixed to the socket. The annular securing member contacts the stop to secure the second tubular element axially relative to the first tubular element while also allowing the second tubular element to rotate relative to the first tubular element and annular securing member.

9 Claims, 3 Drawing Sheets

(56) References Cited

U.S. PATENT DOCUMENTS

| | | | |
|---|---|---|---|
| 8,746,747 B2 | 6/2014 | McPherson | |
| 8,827,319 B2 * | 9/2014 | Chung | F16L 27/0816 |
| | | | 285/272 |
| 2006/0191623 A1 | 8/2006 | Lutz et al. | |
| 2008/0012307 A1 * | 1/2008 | Taillon | F16L 39/04 |
| | | | 285/282 |
| 2008/0106095 A1 * | 5/2008 | Harris | F16L 21/035 |
| | | | 285/179 |
| 2009/0014121 A1 | 1/2009 | McPherson | |
| 2010/0008712 A1 * | 1/2010 | Sitz | F16L 27/0804 |
| | | | 403/65 |
| 2012/0326440 A1 * | 12/2012 | Weinhold | F16L 3/1222 |
| | | | 285/374 |
| 2015/0042087 A1 * | 2/2015 | Zaffetti | F16L 27/06 |
| | | | 285/275 |
| 2015/0176732 A1 * | 6/2015 | Courpet | F16L 25/025 |
| | | | 285/286.1 |
| 2016/0010775 A1 * | 1/2016 | Morroney | F16L 33/00 |
| | | | 285/127.1 |

* cited by examiner

ROTATABLE PIPE ADAPTER

TECHNICAL FIELD

The present disclosure relates generally to an adapter for joining pipes, wherein the joined pipes are rotatable relative to one another after attachment to the adapter.

BACKGROUND

Piping has been used to transmit liquids such as drinking water, waste water, irrigation water, fire sprinkler water, sewage, and chemicals to name but a few. Often such piping is made of a plastic, such as Polyvinyl Chloride (PVC), Chlorinated Polyvinyl Chloride (CPVC), Acrylonitrile Butadiene Styrene (ABS), Polyethylene (PE), Cross-Linked Polyethylene (PEX), or others. Piping may be installed in an environment such as within a trench in the earth, within the walls or ceiling of a building, between two already fixed but not necessarily aligned external elements, etc. Due to the general rigidity of such piping, care must be taken to accurately design, lay out and connect piping. Because adjacent pieces of piping and their fittings are often connected permanently (e.g., via an epoxy or the like), a technician connecting such elements has little flexibility in installation path and only one chance to make each connection correctly. Further, in some situations, the intended installation environment differs from the planned layout, for example, if a trench is not accurately dug or is dug differently than planned due to rocks or other unforeseen subterranean impediments, if a building is not constructed exactly to plan or plans are changed after piping layout is completed, etc. Thus, for various reasons, it can be difficult and time consuming to develop and install various types of piping systems. Also, in seismic zones, rigid pipe connections are subject to failure in case of an earthquake.

Accordingly, improvements would be welcome to piping systems that provide more flexibility in creating a layout or to a technician during installation, more reliability in case of seismic activity and/or addressing one or more drawbacks of current systems, or any other issues.

SUMMARY

According to certain aspects of the disclosure, a pipe adapter includes a first tubular element defining a central axis and having a first portion, a second portion axially adjacent the first portion, and a radially-extending shoulder between the first portion and second portion, the first portion having an inner diameter and an outer diameter, the second portion having an inner diameter larger than the first portion inner diameter and an outer diameter larger than the first portion inner diameter. A second tubular element defines a central axis and has a first portion and a second portion axially adjacent the first portion, the first portion of the second tubular element having an inner diameter and an outer diameter just smaller than the inner diameter of the second portion of the first tubular element, the second tubular element first portion having a distal end that abuts the shoulder and having a radially extending stop. An annular sealing member is located between the first portion of the second tubular element and the second portion of the first tubular element and provides an axial seal therebetween. An annular securing member is rotatably disposed around the first portion of the second tubular element and located within and fixed to the second portion of the first tubular element. The annular securing member contacts the stop to secure the second tubular element axially relative to the first tubular element while also allowing the second tubular element to rotate relative to the first tubular element and annular securing member. Various options and modifications are possible.

According to certain other aspects of the disclosure, a pipe adapter includes a first tubular element having a first portion and a second portion axially adjacent the first portion, the second portion defining a socket. A second tubular element has a first portion and a second portion axially adjacent the first portion, the first portion defining a distal end sized for insertion into the socket and having a radially extending stop. An annular sealing member is located between the first portion of the second tubular element and the second portion of the first tubular element and provides an axial seal therebetween. An annular securing member is rotatably disposed around the first portion of the second tubular element and located within and fixed to the socket. The annular securing member contacts the stop to secure the second tubular element axially relative to the first tubular element while also allowing the second tubular element to rotate relative to the first tubular element and annular securing member. As above, various options and modifications are possible.

BRIEF DESCRIPTION OF THE DRAWINGS

More details of the present disclosure are set forth in the drawings.

DETAILED DESCRIPTION

Figure 1:
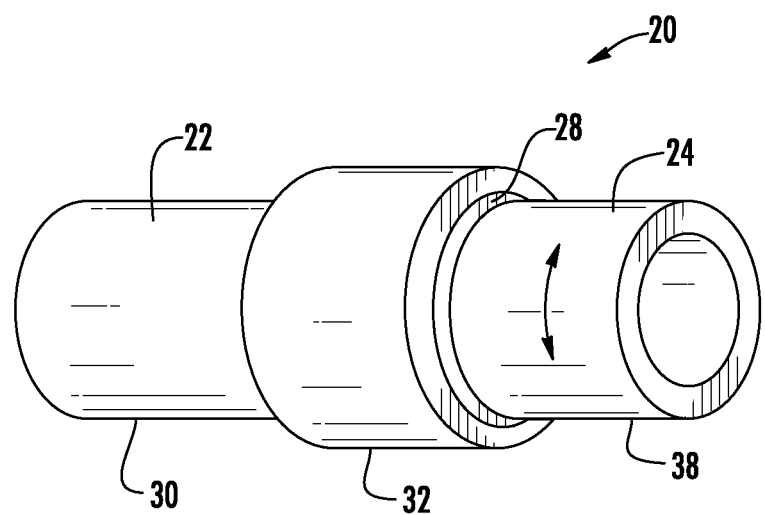
FIG. 1 is an isometric view of a first embodiment of a pipe adapter according to certain aspects of the disclosure.
Figure 2:
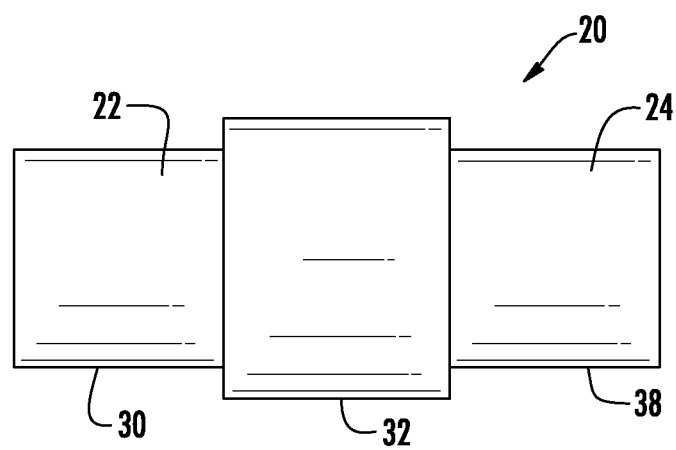
FIG. 2 is a side view of the pipe adapter of FIG. 1.
Figure 3:
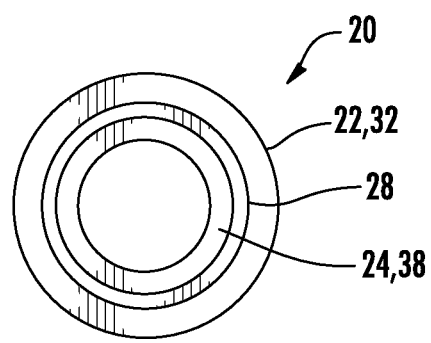
FIG. 3 is an end view of the pipe adapter of FIG. 1.

Detailed reference will now be made to the drawings in which examples embodying the present disclosure are shown. The detailed description uses numeral and letter designations to refer to features in the drawings. Like or similar designations in the drawings and description have been used to refer to like or similar parts of the disclosure.

The drawings and detailed description provide a full and enabling description of the disclosure and the manner and process of making and using it. Each embodiment is provided by way of explanation of the subject matter not limitation thereof. In fact, it will be apparent to those skilled in the art that various modifications and variations may be made to the disclosed subject matter without departing from the scope or spirit of the disclosure. For instance, features illustrated or described as part of one embodiment may be used with another embodiment to yield a still further embodiment.

Generally speaking, FIGS. 1-8 depict examples of pipe adapters that can be used to connect various types of piping or connectors while allowing relative rotation. A first embodiment of such a pipe adapter 20 is shown in FIGS.

1-6. As illustrated, pipe adapter 20 includes first tubular element 22, second tubular element 24, annular sealing member 26 and annular securing member 28. Components 22, 24 and 28 may be formed of PVC material, but plastics such as CPVC, ABS, PE, PEX and still others could also be employed. Annular sealing member 26 is preferably an O-ring formed of a rubber or thermoplastic such as Nitrile Butadiene Rubber (NBR), Hydrogenated Nitrile Butadiene Rubber (HNBR), Carboxylated Nitrile Butadiene Rubber (XNBR), Silicone Rubber (SIR), Fluoroelastomer (FKM), etc.

The choice of material for components 22-28 can be readily selected by one skilled in the art depending on the characteristics (e.g., temperatures, pressures, environment, chemical exposure, etc.) of the application in which the pipe adapter will be deployed. It should therefore be understood that the present disclosure is not limited to particular examples of materials noted above.

As illustrated, first tubular element 22 has a first portion 30 and a second portion 32 adjacent each other along axis 34. First portion 30 has an inner diameter $d_1$ and an outer diameter $d_2$. Second portion 32 has an inner diameter $d_3$ and an outer diameter $d_4$ both larger than their corresponding inner and outer diameters $d_1$, $d_2$ of first portion 30. Second portion 32 defines a socket 35 bounded by shoulder 40 and the walls of inner diameter $d_3$.

Figure 4:
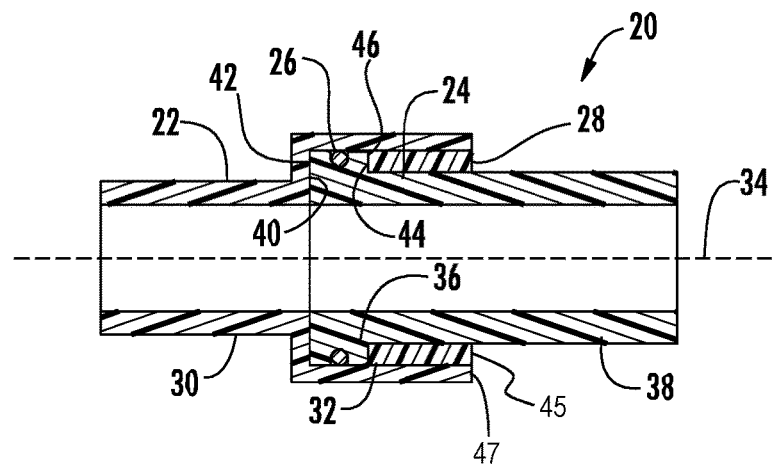
FIG. 4 is a cross-sectional view of the pipe adapter of FIG. 1 taken along line 4-4 in FIG. 1.
Figure 5:
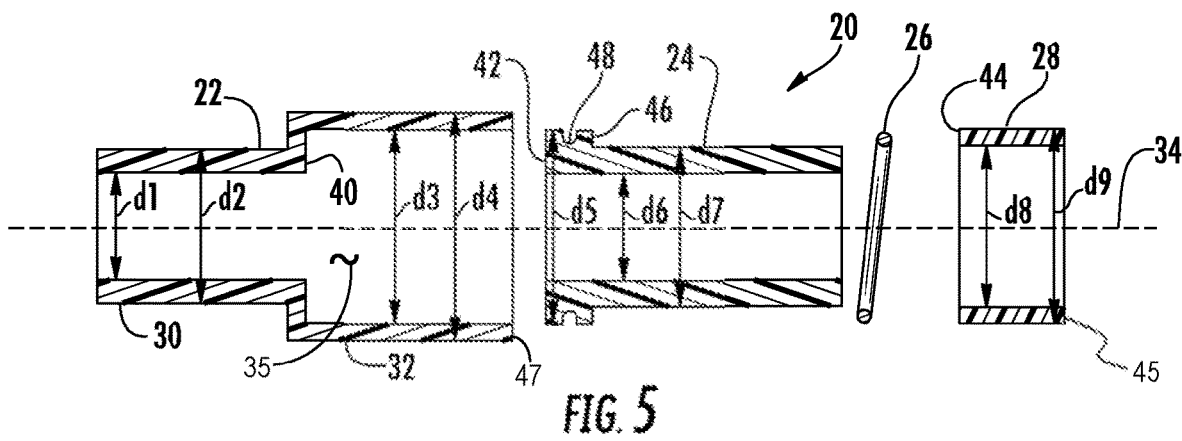
FIG. 5 is an exploded version of the cross-sectional view of FIG. 4.

Second tubular element 24 has a first portion 36 and a second portion 38 axially adjacent the first portion. First portion 36 defines a distal end 42 sized for insertion into socket 35. First portion 36 also has a radially extending stop 46 spaced from distal end 42. Distal end 42 has a diameter $d_5$ just smaller than $d_3$ of socket 35 so that the first and second tubular elements 22,24 are readily slid together along axis 34 while generally maintaining alignment due to the mating cylindrical shapes at the $d_3/d_5$ interface. Thus, during assembly of pipe adapter 20, as shown in FIGS. 4 and 5, first portion 36 of second tubular element 24 is slid into second portion 32 (i.e., socket 35) of first tubular element 22 until distal end 42 hits shoulder 40.

Annular sealing member 26 is located between first portion 36 of second tubular element 24 and second portion 32 of first tubular element 22. Annular sealing member 26 provides a seal preventing axial flow along the $d_3/d_5$ interface between tubular elements 22,24. A channel may be provided in one or both of the d/3/d5 surfaces to receive annular sealing member 26. As illustrated, one such channel 48 is provided in first portion 36 of second tubular element. If desired, additional sealing members could also or alternatively be provided along the d/3/d5 interface or along the shoulder 40/distal end 42 interface to seal between first and second tubular elements 22,24.

Annular securing member 28 is has an internal diameter $d_8$ and an external diameter $d_9$. Internal diameter $d_8$ is sized just larger than external diameter $d_7$ of second tubular element 24. External diameter $d_9$ of annular securing member 28 is sized just smaller than internal diameter $d_3$ of second portion 32 first tubular element 22. Therefore, after the first and second tubular elements 22,24 are slid together (with annular sealing member 26 in place) annular securing member 28 can be slid onto second tubular element 24 within socket 35. Annular securing member 28 has a distal end 44 that abuts stop 46 on first portion 36 of second tubular element 24 when annular securing member 28 is fully installed. It may be preferable, as shown, that end 45 of annular securing element 28 and end 47 of second portion 32 of first tubular element 22 are radially aligned after insertion (see FIGS. 1, 2 and 4). At this point, each of first tubular element 22, second tubular element 24 and annular securing member 28 are all relatively rotatable relative to each other around axis 34.

After assembly, annular securing member 28 is fixed within socket 35 of first tubular element 22, for example, by at least one of an adhesive, an epoxy, hot welding, ultrasonic welding, mating threads, and/or a snap fit. Annular securing member 28 is preferably not fixed to second tubular element 24. After assembly and fixing of annular securing member 28 within socket 35, distal end 44 of annular securing member 28 contacts stop 46 on second tubular element 24 to secure second tubular element 24 axially relative to first tubular element 22 while also allowing second tubular element 24 to rotate relative to first tubular element 22 and annular securing member 28.

Figure 6:
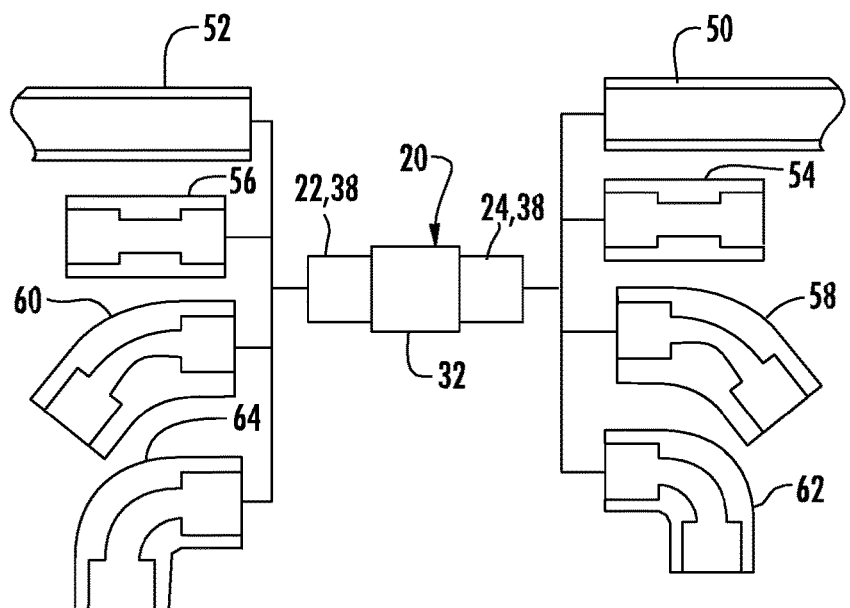
FIG. 6 is a diagrammatic view showing possible connections to the pipe adapter of FIG. 1.

Adapter 20 can be used to connect various types of pipes and connectors, as schematically illustrated in FIG. 6. For example, pipes 50, 52, straight connectors 54, 56, angled connectors 58,60, right-angled connectors 62,64, and other piping elements can be attached to portions 30 and 38. Adapter 20 has particular utility where one or two angled connectors are employed, or where straight connectors or pipes are connected to pipes angled further on. In such case the rotatability of the element attached to portion 38 relative to the element attached to portion 30 allows for some adjustability. Thus, the additional elements can be fixed to portions 30 and 38, while leaving them relatively rotatable while further elements are attached along the layout. If a rigid layout is desired, after the layout is completed, second tubular element 24 can be permanently fixed (e.g., by an epoxy, weld or other ways) to annular securing element 28. Alternatively, if desired, the rotatability may be maintained permanently by not fixing together such parts.

Figure 7:
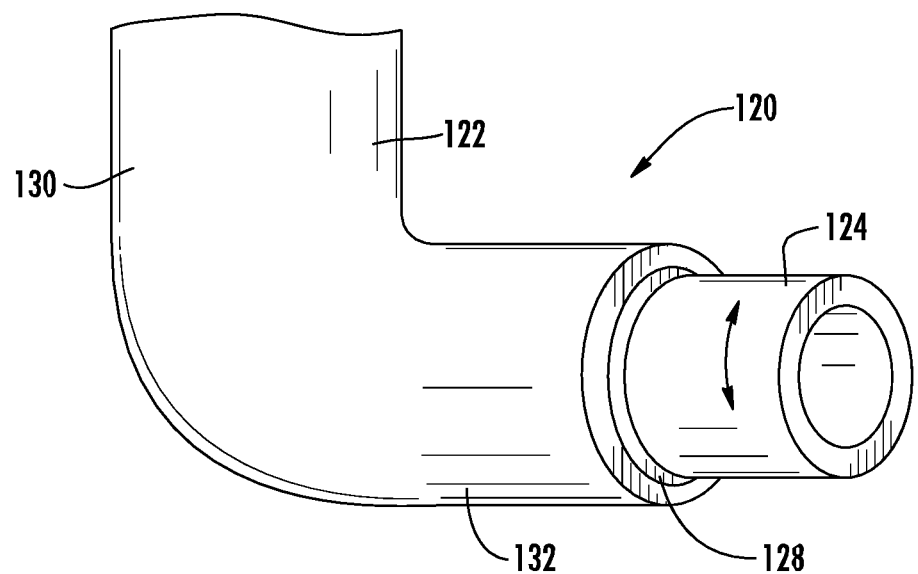
FIG. 7 is an isometric view of a second embodiment of a pipe adapter according to certain aspects of the disclosure.
Figure 8:
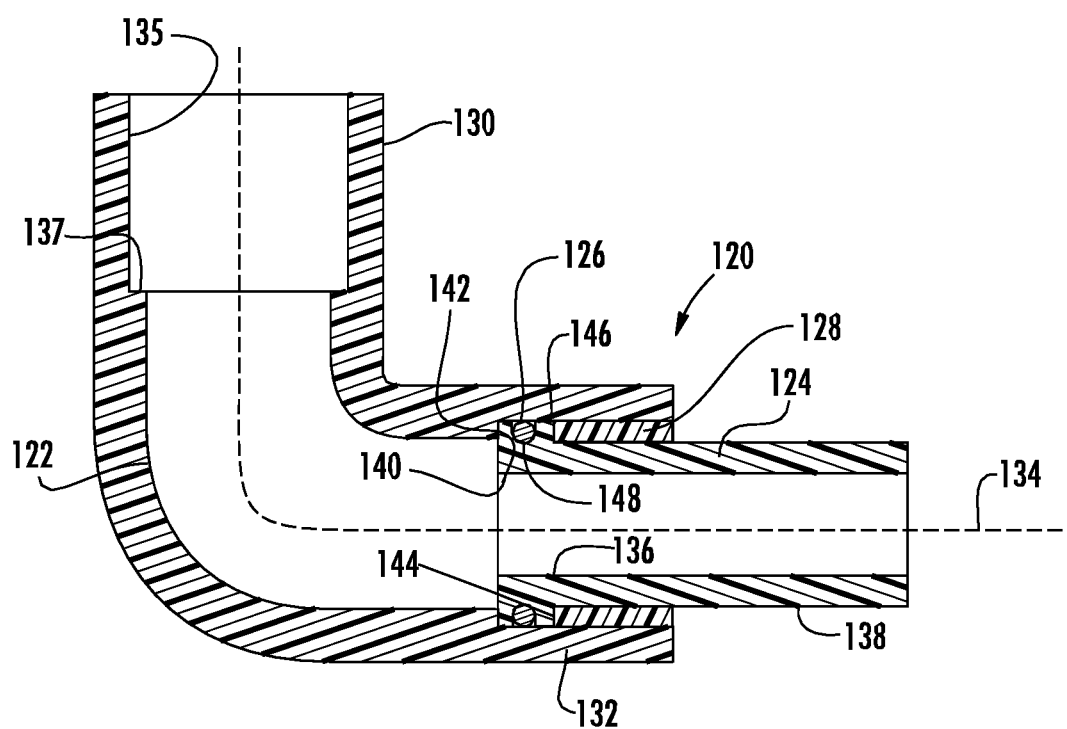
FIG. 8 is a cross-sectional view of the pipe adapter of FIG. 7 taken along line 8-8 in FIG. 7.

FIGS. 7 and 8 depict another embodiment of a pipe adaptor 120 in which like or similar elements are identified with like or similar reference numerals. For brevity, all depicted elements of pipe adaptor 120 are not described herein; please refer to the description above.

Pipe adaptor 120 includes a first tubular element 122, a second tubular element 124, an annular sealing member 126 and an annular securing member 128. The latter three parts are essentially similar to the corresponding parts of pipe adaptor 20 and thus need not be discussed in further detail. Note that shoulder 140 contacts distal end 142, annular sealing member 126 is located in channel 148 in first portion 136 of second tubular element 124, and annular securing member 128 is located fully within second portion 132 of first tubular element 122.

However, first tubular element 122 differs from first tubular element 22 in that element 122 has a first portion 130 formed with a socket 135 having a shoulder 137. Socket 135 is sized for receiving a pipe therein. Alternatively, a second set of elements 124, 126 and 128 may be inserted into socket 135 in a similar fashion. To provide two elements 124 rotatable relative to element 122.

Note the right angle turn of axis 134 between socket 135 and second portion 138 of second tubular element 124. As illustrated, first tubular element 122 incorporates the structure and functionality of a right-angle connector within the adapter itself. It should be understood that path of axis 134 may be straight (providing a linear connector function) or angled at any desired direction (i.e., 30 degrees, 45 degrees, 60 degrees, 90 degrees, etc.) to which the first tubular element 122 can be manufactured. Thus, pipe adapter 120 provides the benefits of pipe adapter 20 above with respect to the rotational adjustability of parts. Pipe adapter 120 also provides a compact assembly including an on-board socket so that, for example, a connector such as connectors 54-62 with two sockets need not also be employed with adapter 20 when a socket is desired at a location adjacent the adapter.

The disclosed pipe adapters therefore provide improved efficiency and flexibility in installation of piping systems. The pipe adapters can be mixed and matched with various off the shelf parts, and can be made in various standard and nominal pipe sizes. The pipe adapters can be sold pre-made (with rotatability) or can be sold in kits include parts for one adapter, or in kits include multiple units of each part with multiple optional parts (such as connectors 54-62), and or with straight or angled connector-like parts or pipes with built in sockets 135 like part 122. The rotatable adapters provide relief from stresses and strains caused by seismic activity. Thus, the present disclosure provides a number of different ways in which technicians working in the field can benefit, save time, work though misalignments or changes in the field on the fly, and that can reduce failures in case of seismic activity.

While preferred embodiments of the invention have been described above, it is to be understood that any and all equivalent realizations of the present invention are included within the scope and spirit thereof. Thus, the embodiments depicted are presented by way of example only and are not intended as limitations upon the present invention. Thus, while particular embodiments of the invention have been described and shown, it will be understood by those of ordinary skill in this art that the present invention is not limited thereto since many modifications can be made. Therefore, it is contemplated that any and all such embodiments are included in the present invention as may fall within the literal or equivalent scope of the appended claims.

I claim:

1. A pipe adapter comprising:
    a first tubular element made of a plastic and defining a central axis and having a first portion, a second portion axially adjacent the first portion, and a radially-extending shoulder between the first portion and second portion, the first portion having an inner diameter and an outer diameter, the second portion having an inner diameter larger than the first portion inner diameter and an outer diameter larger than the first portion inner diameter;
    a second tubular element made of a plastic and defining a central axis and having a first portion and a second portion axially adjacent the first portion, the first portion of the second tubular element having an inner diameter and an outer diameter just smaller than the inner diameter of the second portion of the first tubular element, the second tubular element first portion having a distal end that abuts the shoulder and having a radially extending stop, the first portion of the second tubular element defining a channel opposing an inner surface of the second portion of the first tubular element;
    an annular sealing member located in the channel and between the first portion of the second tubular element and the second portion of the first tubular element and providing an axial seal therebetween; and
    an annular securing member made of a plastic and rotatably disposed around the second portion of the second tubular element and located fully within and non-mechanically fixed to the second portion of the first tubular element, the annular securing member contacting the stop to secure the second tubular element axially relative to the first tubular element while also allowing the second tubular element to rotate relative to the first tubular element and annular securing member.

2. The pipe adapter of claim 1, wherein at least one of the first portion of the first tubular element and the second portion of the second tubular element are each sized for attachment to a socket of a respective pipe connector.

3. The pipe adapter of claim 2, wherein the respective pipe connectors are selected from straight pipe connectors, angled pipe connectors and right-angled pipe connectors.

4. The pipe adapter of claim 2, further including the respective pipe connectors joined to the pipe adapter to thereby form an assembly.

5. The pipe adapter of claim 1, wherein at least one of the first portion of the first tubular element and the second portion of the second tubular element are each sized for attachment within an end opening of a respective pipe.

6. The pipe adapter of claim 5, further including the respective pipes joined to the pipe adapter to thereby form an assembly.

7. The pipe adapter of claim 1, wherein at least one of the first portion of the first tubular element and the second portion of the second tubular element each define a socket for receiving respective a pipe therein.

8. The pipe adapter of claim 7, wherein the at least one of the first portion of the first tubular element and the second portion of the second tubular element defining the socket forms a pipe connector selected from straight pipe connectors, angled pipe connectors and right-angled pipe connectors.

9. The pipe adapter of claim 1, wherein the annular sealing member includes an O-ring.

* * * * *